(12) United States Patent
Niazi

(10) Patent No.: US 9,745,545 B2
(45) Date of Patent: Aug. 29, 2017

(54) FASTER AGING OF ALCOHOLIC BEVERAGES

(71) Applicant: Sarfaraz K. Niazi, Deerfield, IL (US)

(72) Inventor: Sarfaraz K. Niazi, Deerfield, IL (US)

( * ) Notice: Subject to any disclaimer, the term of this patent is extended or adjusted under 35 U.S.C. 154(b) by 0 days.

(21) Appl. No.: 14/754,041

(22) Filed: Jun. 29, 2015

(65) Prior Publication Data

US 2016/0376538 A1    Dec. 29, 2016

(51) Int. Cl.
   *C12H 1/00*     (2006.01)
   *C12H 1/22*     (2006.01)
   *C12G 3/07*     (2006.01)

(52) U.S. Cl.
   CPC ............... *C12H 1/22* (2013.01); *C12G 3/065* (2013.01)

(58) Field of Classification Search
   CPC ............. C12G 3/065; C12G 3/06; C12H 1/22

USPC .............................................. 99/277.1, 277.2
See application file for complete search history.

(56) References Cited

U.S. PATENT DOCUMENTS

| | | | | |
|---|---|---|---|---|
| 2,105,693 A | * | 1/1938 | Jones | C12G 3/065 99/277.1 |
| 3,021,780 A | * | 2/1962 | Bobbe | C12G 3/065 99/277.1 |
| 7,284,476 B2 | * | 10/2007 | Roleder | C12G 3/065 426/330.4 |
| 2014/0010915 A1 | * | 1/2014 | Barr | C12G 1/02 426/15 |
| 2016/0355772 A1 | * | 12/2016 | Karasch | C12G 3/065 |

* cited by examiner

*Primary Examiner* — Reginald L Alexander
(74) *Attorney, Agent, or Firm* — Sarfaraz K. Niazi

(57) ABSTRACT

Aging of alcoholic beverages is expedited by increasing the exposed surface area of wood by introducing multiple wooden surfaces, improving mixing by reducing the spacing between wooden surfaces, maintaining the temperature of alcoholic beverage to optimal level and reducing the cost or production by working with larger volumes at a time.

19 Claims, 2 Drawing Sheets

FASTER AGING OF ALCOHOLIC BEVERAGES

BACKGROUND OF THE INVENTION

The alcoholic beverage industry in the US has a market of $200 Billion, of the $350 Billion market of the total beverage industry. Almost half of the alcoholic beverages, except malt beverages like beer, are aged in wooden barrels to impart distinct taste and flavor by allowing the chemical components in alcoholic beverages to react and create distinctive aroma and palate. Aging also involves the reaction of the components of the fermented liquids over time. These beverages include whiskey, wine, bourbon, rum, tequila, cognac and many more. The aging process can range from a few months to decades before the beverage is ready to drink. This length of time is needed to allow sufficient leaching of chemicals like phenols from the wood barrels wherein the beverage is stored. In ideal situations, the aging is allowed to proceed slowly as vibrations, and heat fluctuations can hasten taste deterioration and cause an adverse effect on the beverage. In general, a beverage has a greater potential to develop complexity and more aromatic bouquet if it is allowed to age slowly in a relatively cool environment. However, the current methodology of aging produces significant variability due to concentration gradients within the wooden barrel since the contact with wood is limited to liquids in contact only.

There is a long history of man using artificial means to try to accelerate the natural aging process. In Ancient Rome, a smoke chamber known as a fumarium was used to enhance the flavor of the wine through artificial aging. Amphorae were placed in the chamber, which was built on top of a heated hearth, in order to impart a smoky flavor to the wine that also seemed to sharpen the acidity. The wine would sometimes come out of the fumarium with a paler color just like aged wine. Modern winemaking techniques like micro-oxygenation can have the side effect of artificially aging the wine. In the production of Madeira and Rancio wines, the wines are deliberately exposed to excessive temperatures to accelerate the maturation of the wine. The current method of aging alcoholic beverages does not allow adjusting the temperature of the beverage to finer limits, nor does it allow cycling of temperature ranges during aging. It is highly likely that an alcoholic beverage maker may develop may develop a temperature cycling that will provide an optimal flavor.

Generally, an alcoholic beverage in a holding vessel equipped with the automatic temperature control system will significantly enhance the quality and consistency of flavor achieved. It is noteworthy that all reactions, including leaching and chemical reactions that take place within the alcoholic beverage over time release energy if they are instantaneous in the form of heat causing localized variability of temperature that can have significant impact on the nature of reaction.

Other techniques used to age wine artificially (with inconclusive results on their effectiveness) include shaking the wine, exposing it to radiation, magnetism or ultra-sonic waves. More recently, experiments with artificial aging through high-voltage electricity have produced results above the remaining techniques, as assessed by a panel of wine tasters.

The general consensus is that shaking or mixing alcoholic beverages while aging adversely affects their quality; aging in wooden barrels often requires rotating barrels, even though it is kept to a minimum. There is an unmet need to create a system of mixing of alcoholic beverages during aging that does not involve any external force. There is a need to invoke the thermodynamic principles of mixing such as creating an environment wherein the concentration of extracted chemicals is different, forcing the browning motion to cause mixing of liquids.

It is also important to understand that any shaking of the liquid may also impart energy that may result in reactions that might not happen when the liquid is left undisturbed. The current method of aging alcoholic beverages ignores this aspect. There is a need to develop an apparatus that will allow extreme gentle mixing, the best being what is caused by a diffusion process. To achieve this, in a larger vessel, the contact between wood and the beverage must be provided at a micro level, eliminating variability in the concentration gradient, regardless of the size of vessel or the volume of beverage aged in a single vessel.

Although oak barrels have long been used by winemakers, many wineries now use oak wood chips for aging wine more quickly and also adding desired woody aromas along with butter and vanilla flavors. Oak chips can be added during fermentation or during aging. In the latter case, they are generally placed into fabric sacks and placed into the aging wine.

The diversity of chips available give winemakers numerous options. Oak chips have the benefit of imparting intense oak flavoring in a matter of weeks while traditional oak barrels would need a year or more to convey similar intensity. The critics claim that the oak flavoring from chips tend to be one-dimensional and skewed towards the vanilla extract with the wines still lacking some of the physical benefits that barrel oak imparts. The use of oak powder is also less common than chips. Wines made from these barrel alternatives typically do not age as well as wines that are matured in barrels mainly due to unpredicted transfer rates. In a wine barrel, a flat surface causes movement of components in the wood, therefore, any extrapolation of the surface area calculations must maintain the surface integrity. Prior to 2006, the practice of using oak chips was outlawed in the European Union.

Improvements in micro-oxygenation have allowed winemakers to mimic better the gentle aeration of oak barrels in stainless steel tanks with oak chips.

The use of oak chips in wine making needs to be examined to ascertain why this approach is not conducive to aging of alcoholic beverages. First, it is the consideration of the surface area provided for partitioning of chemicals out of wood and into the alcoholic beverage. It is difficult to project the changes in surface area and thus make conclusions about what is appropriate; secondly, the wood chips may not have been treated the same way it is possible to treat a wooden barrel, including charring, aging and other attributes generally imparted to the wooden barrel prior to its use. An ideal situation would be if the partitioning of chemicals from the wood is allowed to go through a linear surface mimicking the wooden barrel; the Fick's law of diffusion is agnostic to how the surface was created. There is a need to create a method of increasing the surface area exposed to the extraction of chemicals from wood keeping the geometry same and proportional. One way to do this would be to increase the total linear flat surface area exposed.

While the traditional aging of alcoholic beverages in wooden barrels has worked for a very long time, perhaps centuries, there is a need to bring a major change to the science and the art of aging alcoholic beverages. It is necessary because of a variety of difficulties and disadvantages in the traditional methods. However, any change in the traditional process must allow for replicating the process that has been developed over centuries.

The porous nature of an oak barrel allows some levels of evaporation and oxygenation to occur in wine but typically not at levels that would cause oxidation or spoilage of the wine. In a year, the typical 59-gallon barrel can lose anywhere from 5½ to 6½ gallons of wine through the course of evaporation. This evaporation (of mostly alcohol and water) allows the wine to concentrate its flavor and aroma compounds. Small amounts of oxygen are allowed to pass through the barrel and acts as a softening agent upon the tannins of the wine. The traditional method of aging alcoholic beverages in wood barrels has little control over aeration or oxygenation of the alcoholic beverage and it is highly dependent on the porosity of the wood, which might change from barrel to barrel and from one type of wood to another, how it is aged, how it is cut and shaved and how is the barrel put together.

There is a need to eliminate this variability to provide a more consistent exposure to air or oxygen and, where necessary, block exposure to oxygen by flushing the surface with an inert gas such as argon or nitrogen. This cannot be achieved in using wooden barrels; however, a holding vessel with a port to allow entry and to exhaust of gases will make this process more reliable and provide reproducible results.

Wine barrels, especially those made of oak, have long been used as holding vessels in which wine is aged. Aging in oak typically imparts desirable vanilla, butter, and spice flavors to the wine. The size of the barrel plays a large role in determining the effects of oak on the wine by dictating the ratio of surface area to volume of wine with smaller holding vessels having a larger impact. The most common barrels are the Bordeaux barriques style, which hold 59 gallons (225 liters) followed by the Burgundy style barrel, which hold 60 gallons (228 liters). Some New World winemakers use the large hogshead 79-gallon (300 liters) size. Oak trees are typical between 80-120 years old prior to harvesting with the ideal conditions being a cool climate in a dense forest region that gives the trees opportunity to mature slowly and develop a tighter grain. The trees are typically harvested in the winter months when there is less sap in the trunk.

New barrels impart more flavors than do previously used barrels. Over time many of the oak properties get "leached" out of the barrel with layers of natural deposits left from the wine building up in the wood to where after 3 to 5 vintages there may be little or no oak flavors imparted on the wine. The cost of barrels varies due to the supply and demand market economy and can change with different features that a cooperage may offer. Generally these range from $500 to $1000 for a 59-gallon barrel that is made of approximately 33 staves put together. There is a need to optimize the quantity of wood used in aging alcoholic beverages; if thin layers of wood are used, it is likely that in each cycle, almost all of the extractable are removed from the wood, allowing the wood to be discarded after one or perhaps two uses. This approach will allow a consistent production of lots since any carry over effect due to partial depletion of the flavors from the wood will not contribute to variability.

Throughout history other wood types, including chestnut, pine, redwood, and acacia, have been used in crafting winemaking holding vessels. However none of these wood types possess the compatibility with wine that oak has demonstrated in combining its water tight, yet slightly porous, storage capabilities with the unique flavor and texture characteristic that it can impart to the wine that it is in contact with. Chestnut is very high in tannins and is too porous as a storage barrel and must be coated with paraffin to prevent excessive wine loss through evaporation. Redwood is too rigid to bend into the smaller barrel shapes and imparts an unpleasant flavor. Acacia imparts a yellow tint to the wine. Other hardwoods like apple and cherry wood have an off-putting smell. Austrian winemakers have a history of using Acacia barrels. Historically, chestnut was used by Beaujolais, Italian and Portuguese winemakers. Some Rhone wine makers still use paraffin coated chestnut barrels, but the coating minimizes any effect from the wood making its function similar to a neutral concrete holding vessel. In Chile, there are traditions for using a barrel made of rauli wood but it is beginning to fall out of favor due to the musky scent it imparts on the wine. Despite the use of a variety of woods, it has not been possible to combine several woods to create custom taste and palate. The current method of aging alcoholic beverages cannot control the loss of moisture predictably as it depends on various factors such as the type of wood, how it is coated, how it is bound together to form a barrel and several other factors leading to highly variable product that can often not be replicated. There is a need to develop an apparatus that will control the evaporation of alcoholic beverage during aging to allow the most optimal composition at the end of aging period.

While many attempts have been made in the past to accelerate the aging of the alcoholic beverages, there remains an unmet need to invent an apparatus that would allow aging to proceed extremely fast without modifying the natural process of aging that imparts unique character to the alcoholic beverages. This means several special features including allowing partitioning of components of wood through direct contact with wine through a surface as it is achieved during storage in barrels; the process must be gentle, yet expedited to reduce the time required for equivalent aging of the alcoholic beverages. The advantages of the instant invention are the reduction of the cost of the alcoholic beverages and improvement their organoleptic properties. A significant cost saving is accrued by aging larger volumes of alcoholic beverages in a single vessel; it is likely that the aging can be done with 100,000 L vessels instead of using 500 barrels. Such large volume handling is critical to successful commercial operations.

The instant invention involves introducing several wooden shelves in a large non-wood container; the flat surface of wooden shelves allows the calculation of the total surface area exposed and thus project the speed of aging. As the contact surface between the wood surface and the alcoholic beverage is increased several-folds and thereby the rate of natural transfer of chemical components of the wood to the alcoholic beverage is enhanced. The wooden shelves can be wafer-thin and their rigidity supported by a solid support such as a metallic or plastic surface of contained inside a mesh; the thinner is the disc, the higher is the surface area of exposed wood per gram introduced in the aging apparatus.

BRIEF SUMMARY OF THE INVENTION

The instant invention generally relates to an apparatus used for accelerating the aging of the alcoholic beverages. Conventionally, the alcoholic beverages are aged in wood barrels keeping them in these barrels for a long time, even for decades, to achieve certain taste, flavor and another organoleptic character. The cost of aging the alcoholic beverages contributes to the largest fraction of total production cost and creates strategic problems of handling large volumes as the demand for the alcoholic beverages increases and since the manufacturer must predict future requirements to allow appropriate time for the aging.

The usual practice for barrel aging is to leave the barrels in racks undisturbed except for periodic sampling or topping off as evaporation of the water and alcohol depletes the liquid. In some wineries, the barrels are turned to provide some agitation or mixing of the body of the wine. This has little effect on the convection boundary layer, but favorably affects the diffusion profiles of the reactants in the aging process. Because the effect on the aging rate is small, and the effort is large, the turning of barrels is not done by the majority of winemakers. There is a need to develop an apparatus that will allow gentle mixing of the alcoholic beverage in the holding vessel for optimal partitioning of chemicals from the wood.

While exposure to oxygen during racking and aging in the barrel can be of benefit to the wine, excess oxygen can be deleterious and "sour" the wine. Accelerating aging by the introduction of oxygen has to be controlled to prevent deleterious excessive oxidation. There is a need to provide an apparatus that will allow controlled aeration with oxygen or other gasses, including inert gasses to prevent oxidation.

Therefore, it would be advantageous to have a method for increasing the aging process without altering the natural balance of partitioning of aromatic compounds and phenol polymerization reactions that would accelerate the reactions but not alter the equilibrium state of partitioning. This invention would thus be significantly different and unobvious from such invention as extraction of oak wood and adding to wine as described in the U.S. Pat. No. 6,132,788 to Zimlich and U.S. Pat. No. 5,102,675 to Howell or using wood chips with solvents and heat to improve the taste as taught in US Patent Application 2003/0008036 of Huige; this application was rejected and later abandoned. All of these approaches alter the natural balance of aging and are not a good substitute of re-creating the fine aging process.

The price of alcoholic beverages is determined by the quality of the product; however, as each barrel is constructed individually, albeit of the same wood, it is highly likely that there will be a barrel to barrel variation and while the barrels are mixed prior to filling, the overall quality of the product will remain variable from lot to lot. By providing a large scale holding vessel to age the beverage, the quality of the product is made more consistent.

Besides the cost of wooden barrels, besides the cost of the large storage area required to store these barrels, and besides the cost of handling thousands of barrels at a time, sampling them and pooling the product, a significant cost element in the production of these products is the length of time that it takes to manufacture these products. How difficult can it be for a manufacturer to predict what the market volumes will be required 10 or 20 years later? A faster-aging process will allow better business planning and thus reduced the cost of doing business and improved profit margins. The instant invention offers a possibility of reducing the aging time by a factor of 5 to 20, simply on the basis of the mathematical calculations provided herein. It is fully recognized that the aging process is a two-tier process.

DETAIL DESCRIPTION OF THE INVENTION

It has now been discovered that a plausible method of naturally aging wines would involve a method whereby the rate of material transfer between the wood and alcoholic beverage is enhanced but not the equilibrium state; this is accomplished in this invention by gently stirring the alcoholic beverage based on Browning movement, with wooden shelves increasing the total surface area of contact several folds, providing mixing to keep the concentration gradient for partitioning uniform and thus maintain a maximum rate of partitioning.

The surface area of a cylindrical object is calculated as $2\pi r^2 + 2\pi rh$. The inner surface area of a wood barrel is approximately 6535 square inches for a 53-gallon (200 L) barrel. The surface area to volume ratio is about 33. If this ratio is increased, a faster aging will be achieved but as the volume of holding vessel increases, the ratio decreases; for example if the barrel volume is 20 L, the ratio will be 69 and if the volume is 10 L, this ratio will be 89. This is one reason why larger size barrels are not used to age alcoholic beverages. The use of smaller size barrels will increase cost significantly and make it impractical for commercial production.

Figure 1:
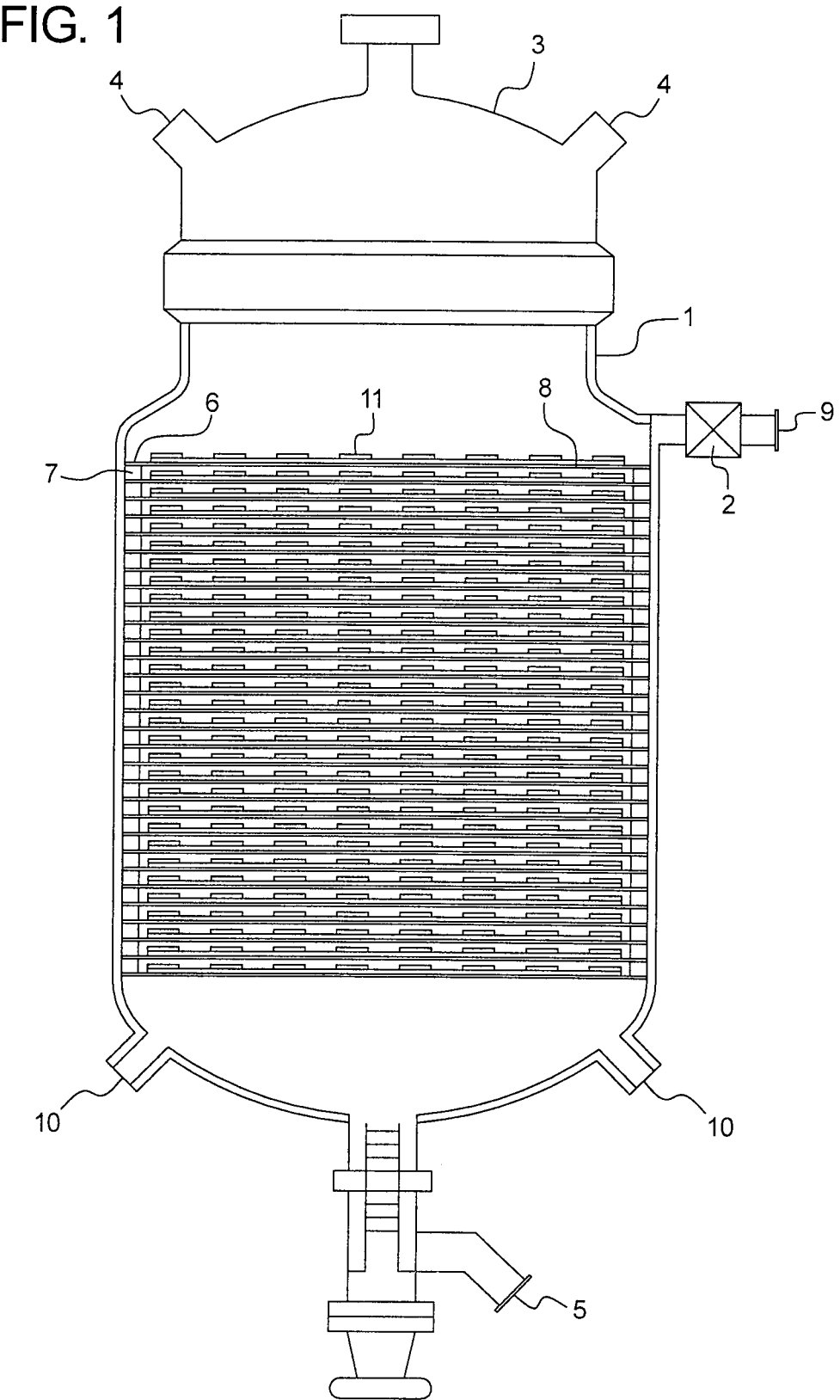
FIG. 1 shows a cross-section view of the apparatus (1) jacketed holding vessel; (2) electronic control mechanism; (3) removable top; (4) inlet; (5) liquid outlet; (6) wooden shelf; (7) gasket; (8) hard mesh; (9) heating/cooling liquid inlet; and (10) heating/cooling liquid outlet.
Figure 2:
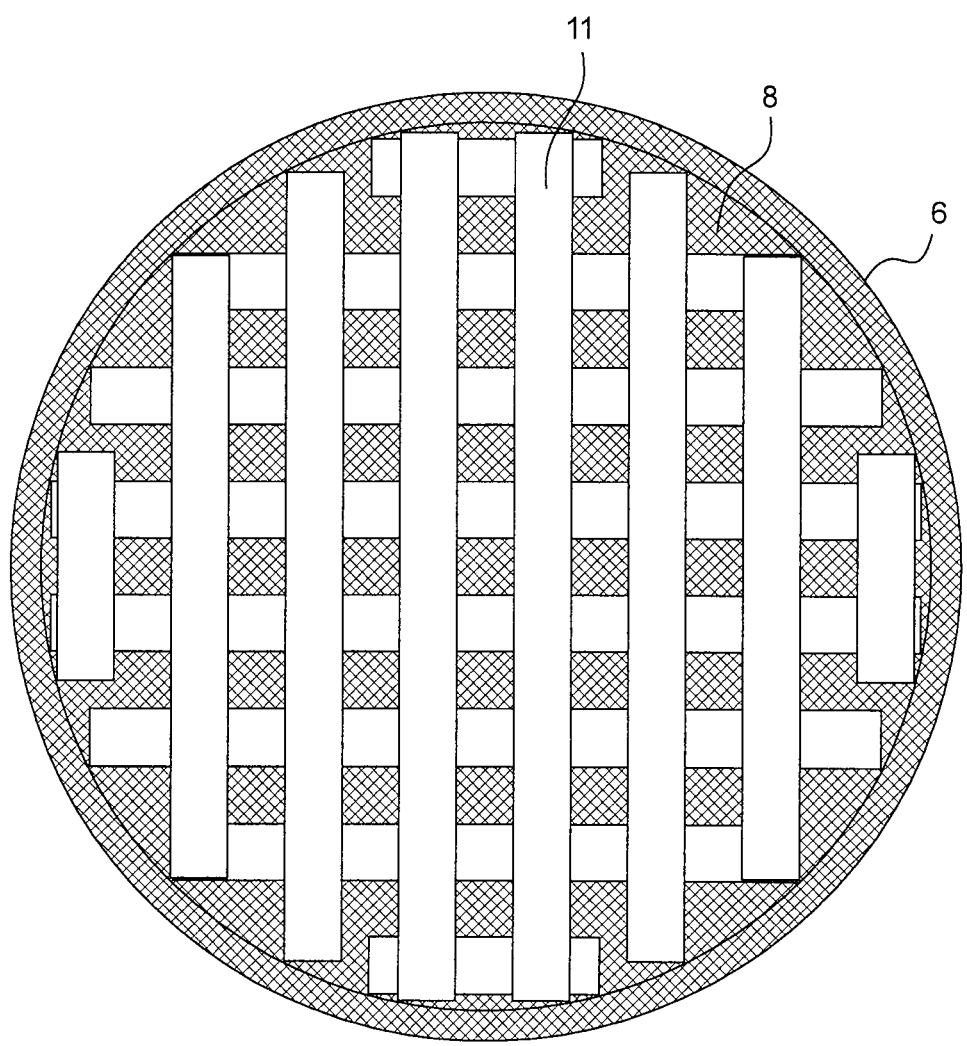
FIG. 2 is a topical view of the shelf with wooden slats 11.

The shelves used in the instant invention can be made from slats of wood assembled together without gluing them together; perhaps, these can be stapled together to form larger surfaces; since very thin layer of wood is used, these shelves will require a solid support, the most ideal being a stainless steel mesh within which the wooden slats are arranged as shown in FIG. 2.

Example 1

A 5.Times. Faster Aging of a 200 L Batch Equivalent to One Barrel Content

Based on above calculations, an area to volume ratio of 32.65 is available in standard barrel aging. To expedite the aging by 5.times., the total area of exposed wood that will be required is 32,675 square inches of the wood surface disposed of inside a volume of 200 L of alcoholic beverage. Let us assume that the diameter of the holding vessel is 24 inches. Using a wooden shelf of size about 24 inches in diameter, the total surface area exposed (on both sides) is 904 square inches. The actual surface area will be larger if we take into account the area from the side walls of the wood shelves as well as the spacing between the wooden slats that would make the shelf. It will require 36 discs of the above size, which is easily accommodated in a 36 inches tall holding vessel. However, the volume of wooden shelves also needs to be taken into consideration; assuming a thickness of 0.1 inches, the volume of wood introduced is =(904/2) .times.0.1.times.36.times.0.016387064 Liters or 26.5 liters. Therefore, the total volume of the vessel should be approximately 226 L.

Example 2

A 5.Times. Faster Aging of a 100,000 L Batch Equivalent to 500 Barrels

Assuming we are using a holding vessel with an internal diameter of about 10 feet to age 100,000 liters; the total wood surface area required is 3.267 million square inches for 5.times. aging. Using discs of 10 feet diameter, the surface area of each shelf as a complete circle will be 22,618 square inches (both sides); to provide a total area of 3.27 million square inches, about 144 shelves will be needed. The total volume of all shelves assuming a thickness of 0.1 inches, will be =(22618/2).times.0.1.times.144.times. 0.016387064=2,668 liters. The total volume of the vessel should be 102,668 liters; a height of 12 feet will provide a volume of 106,000 liters.

The commercial impact of the invention disclosed here is remarkable. In most instances, a five- to ten-fold reduction in aging can be achieved using a similar geometry and exposure of wood with the alcoholic beverage.

In one embodiment, the present invention is a novel system of aging the alcoholic beverages wherein the process of aging is carried out naturally.

In another embodiment, the present invention is a method of accelerating the aging by increasing the linear surface area of wood available for the transfer or aromatic and non-aromatic components of wood.

In another embodiment, the present invention provides for large scale aging to reduce the cost.

In another embodiment, the present invention improves homogeneity and removes barrel to barrel variations in the quality of aging.

In another embodiment, the instant invention provides mixing of various types of woods to impart a signature flavor to alcoholic beverages, something that is not possible with the use of the standard aging process.

In another embodiment, the instant invention allows for aeration to control oxidation and create and optimal taste.

In another embodiment, the instant invention allows for gentle mixing of the contents caused by diffusion process.

In another embodiment, the instant invention allows fine control of the temperature of the alcoholic beverage to obtain higher consistency in flavor and other quality attributes.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus for accelerating aging of alcoholic beverages comprising:
a jacketed holding vessel having an inner volume;
an electronic control mechanism to adjust and maintain the temperature of the alcoholic beverage inside the holding vessel;
a removable top attached to the vessel;
at least one inlet;
at least one liquid outlet;
a plurality of wooden shelves disposed inside said holding vessel;
a spacing gasket disposed between each shelf; and
a hard mesh to support each wooden shelf.

2. The apparatus of claim 1, wherein the holding vessel is cylindrical, rectangular or oval in shape.

3. The apparatus of claim 1, wherein the wooden shelves are circular, oval or rectangular in shape.

4. The apparatus of claim 1, wherein the thickness of the wooden shelves ranges from 0.1 to 1 inch.

5. The apparatus of claim 1, wherein the thickness of the spacing gasket ranges from 0.1 to 1 inch.

6. The apparatus of claim 1, wherein each wooden shelf is made of wood selected from the group consisting of American oak, French oak, pine, cherry, chestnut, acacia, rauli, and redwood, or a combination thereof.

7. The apparatus of claim 6, wherein the plurality of wooden shelves is made of same type of wood.

8. The apparatus of claim 6, wherein a plurality of wooden shelves is made of more than one type of wood.

9. The apparatus of claim 5, wherein the wooden shelves are made of aged wood.

10. The apparatus of claim 6, wherein the wooden shelves are made of smoked wood.

11. The apparatus of claim 1, wherein the wooden shelves are made rigid by providing a material support to the wooden shelf.

12. The apparatus of claim 1, wherein the inlet is used to exhaust gases or introduce air or oxygen to the holding vessel.

13. The apparatus of claim 1, wherein the inlet is used to flush out the vessel with an inert gas prior to introducing the alcoholic beverage in the vessel.

14. The apparatus of claim 1, wherein the inlet is used to introduce alcoholic beverage into the vessel.

15. The apparatus of claim 1, wherein the liquid outlet is used to remove aged alcoholic beverage from the vessel.

16. The apparatus of claim 1, wherein the temperature of the alcoholic beverage in the holding vessel is maintained between 5° C. to 50° C.

17. The apparatus of claim 1, wherein said holding vessel is made of a material selected from the group of materials consisting of stainless steel, carbon steel, aluminum, plastic, and glass.

18. The apparatus of claim 1, wherein the alcoholic beverage is a brewed beverage or a distilled beverage.

19. The apparatus of claim 1, wherein the alcoholic beverage is whiskey, wine, bourbon, rum, tequila, cognac or vodka.

* * * * *